United States Patent [19]
Rhee et al.

[11] Patent Number: 5,686,559
[45] Date of Patent: Nov. 11, 1997

[54] POLY(IMIDE-AMIC ESTER), PROCESS FOR PREPARING THE SAME, AND PROCESSES FOR PREPARING POLYIMIDE FILM AND POLYIMIDE FIBER FROM THE SAME

[75] Inventors: Suh Bong Rhee; Myong Hoon Lee; Ji Woong Park, all of Taejeon, Rep. of Korea

[73] Assignee: Korea Research Institute of Chemical Technology, Daejeon, Rep. of Korea

[21] Appl. No.: 558,597

[22] Filed: Oct. 30, 1995

[30] Foreign Application Priority Data

Oct. 31, 1994 [KR] Rep. of Korea ............... 94-28242

[51] Int. Cl.$^6$ .................. C08G 73/10; C08G 69/26
[52] U.S. Cl. ............... 528/353; 528/125; 528/126; 528/128; 528/170; 528/172; 528/173; 528/176; 528/185; 528/188; 528/220; 528/229; 528/350; 428/395; 428/396; 428/473.5
[58] Field of Search ............... 528/353, 125, 528/126, 128, 170, 172, 173, 176, 185, 188, 350, 220, 229

[56] References Cited

U.S. PATENT DOCUMENTS

| | | | |
|---|---|---|---|
| 3,730,946 | 5/1973 | Heath et al. | 528/185 |
| 4,136,085 | 1/1979 | Hanson | 528/189 |
| 5,357,032 | 10/1994 | Rhee et al. | 528/353 |

FOREIGN PATENT DOCUMENTS 0 171 707 A2  2/1986  Germany.

OTHER PUBLICATIONS

*Chemical Abstracts*, 134538b, vol. 150 (1986).
*Chemical Abstracts*, 43573t, vol. 105 (1986).
K.H. Becker et al., *Macromolecules*, vol. 25, No. 25, pp. 6784–6790 (1992).

Primary Examiner—Jeffrey C. Mullis
Assistant Examiner—P. Hampton-Hightower
Attorney, Agent, or Firm—Fitch, Even, Tabin & Flannery

[57] ABSTRACT

A poly(imide amic ester) having repeating unit of formula (I) and a process for the preparation thereof are provided, wherein formula (I) has the structure $$\left( RO-\underset{\underset{O}{\overset{\overset{O}{\parallel}}{C}}}{\overset{\overset{O}{\overset{\parallel}{C}}-NH-Ar'-N}}\underset{\underset{Ar}{}}{}\overset{O}{\underset{O}{\overset{\parallel}{\underset{\parallel}{C}}}}\underset{Ar''}{}\overset{O}{\underset{O}{\overset{\parallel}{\underset{\parallel}{C}}}}N \right)$$

(I)

wherein Ar is,

[structure] or [structure];

Ar' is,

[structure] or [structure];

Ar'' is

[structure with F$_3$C, CF$_3$],

[structure with O bridge], or

[structure with SO$_2$ bridge]; and

R is selected from the group consisting of CH$_3$, CH$_2$CH$_3$, CH(CH$_3$)$_2$, CH$_2$CH$_2$CH$_3$, CH$_2$(CH(CH$_3$)$_2$ and C(CH$_3$)$_3$. Further, processes for the preparation of polyimide, polyimide film and polyimide fiber using the above poly(imide amic ester) are provided.

23 Claims, 1 Drawing Sheet

POLY(IMIDE-AMIC ESTER), PROCESS FOR PREPARING THE SAME, AND PROCESSES FOR PREPARING POLYIMIDE FILM AND POLYIMIDE FIBER FROM THE SAME

BACKGROUND OF THE INVENTION

1. Field of the Invention

The present invention relates to poly(imide-amic ester) which is useful as a prepolymer for the preparation of polyimides. And, more particularly, the invention relates to poly(imide-amic ester) having chemical stability in a solution or solid state and excellent processability, to a process for preparing the same comprising chemical imidation of poly(amic acid ester), and to processes for preparing polyimide, polyimide film and polyimide fiber prepared from said poly(imide-amic ester).

2. Description of the Prior Art

Polyimide is usually prepared by thermal or chemical treatment of poly(amic acid) prepolymer. Poly(amic acid), which is prepared by polymerization of a diamine with an acid dianhydride, is a polymer having an amic acid group as the repeating unit.

The amic-acid group has relatively poor storage stability and may undergo depolymerization to amine and acid anhydride end groups by an equilibrium reaction during storage in a solution or during the thermal imidation process. The resulting acid anhydride end groups are then hydrated by small amounts of water which may have penetrated into the reaction system from the exterior or which is formed by imidation of other surrounding amic acid groups. The hydration of acid anhydride gives dicarboxylic acid groups, which are difficult to react with amine groups.

The lowering of the molecular weight of poly(amic acid) due to the degradation of the main chain thereof and the loss of activity due to the hydration of acid anhydride end groups reduce the molecular weight of polyimide produced by imidation of poly(amic acid), affecting the physical and chemical properties of the end product.

As mentioned above, poly(amic acids) have poor chemical stability. Moreover, it has been found that aromatic polyimides have poor processability because of their poor solubility/fusibility. To solve these problems, U.S. Pat. No. 4,136,085, U.S. Pat. No. 3,730,946, DE-A 3 504 481 and EP 171 707 suggest modified polyimides which are produced by introducing a more flexible chemical structures than the imide structure, such as ester, ether or amide structures, into main chains of aromatic polyimides. These modified polyimides have improved processability because of their high solubility/fusibility after imidation. However, these modified polyimides have suffered from the problems that they should be used at lower temperatures, as compared with unmodified aromatic polyimides, because of their lowered heat resistance due to the flexible structures introduced into the main chains.

Accordingly, it is necessary to improve or eliminate the chemical instability of prepolymers of polyimides in order to improve processability of polyimides while maintaining excellent heat resistance.

Macromolecules, 25, 6784 (1992) discloses poly(amic esters) which have been modified from poly(amic acid) structure so as to impart chemical stability. Since these poly(amic esters) have a structure in which carboxylic acid groups in amic acid groups responsible for chemical instability thereof are esterified, they have higher stability and thus have improved processability in a prepolymer state. However, since aromatic tetracarboxylic diester dichlorides, which are an essential monomer in the preparation of the poly(amic esters), are inclined to react so sensitively with nucleophiles such as water or alcohols, they are liable to lose their activity as a monomer during purification or storage, and thus, are difficult to use in mass production.

Moreover, a solution of poly(amic esters) prepared from such dichloride monomers contains chloride ions which are released from polymerization of the monomers. If the polymerization solution is used in the production of film without any further treatment for removal of the chloride ions, residual chloride ions degrade the physical properties of the polyimide end products and corrode the substrates to which the polyimide products thus produced are attached. Particularly, if the polyimide products are used as an insulating material in electric/electronic products, deterioration in the insulation property and corrosion of electric/electronic parts may be caused by the chloride ions.

U.S. Pat. No. 5,357,032 discloses poly(amic acid esters) in which half of the amic acid groups are esterified with alcohols, and a process of producing aromatic polyimide alternating copolymers by thermal imidation of said poly(amic acid esters). These poly(amic acid esters) have increased stability in solution because they have a reduced amic acid group ratio, which amounts to half of the amic acid group ratios compared with polyamic acids. They also permit the preparation of polyimide alternating copolymers having two different aromatic dianhydride units alternatively repeated. Moreover, because they have no chloride ions and/or nonvolatiles which are created as by-products during polymerization, the polymer solution prepared therefrom may be used without any further treatment.

However, because half of the amic acid groups still remain in the chain of the polyamic ester prepolymers, they have unsatisfactory chemical stability. It is difficult separate the above poly(amic esters) in a solid state and to store in solution for a long-term period.

Polyamic acids and polyamic esters which have been heretofore used as prepolymers for polyimides have a different structure from polyimides obtained after the completion of imidation process. Namely, amide groups which interconnect repeating units are converted into imide rings of a rigid structure after completion of imidation.

Therefore, since the prepolymers of polyimides do not have various advantageous physical and chemical properties which can be developed by the rigid structure of the polyimides, they have lower mechanical strength. Thus, it is difficult to apply some types of processing, e.g., drawing or spinning, during the prepolymer stage. In addition, since the prepolymers are chemically unstable, they are liable to undergo depolymerization, resulting in a reduced molecular weight and a deterioration in physical properties. Thus, it is desired to partially or wholly introduce an imide structure into the structure of the prepolymers in order to provide them with physical stability.

We solved various problems in prepolymers of polyimides, such as chemical instability, lower mechanical strength, preparation difficulty, etc., as mentioned above. We have found that the above problems can be solved by a novel prepolymer having a structure in which some of amic acid groups present are converted into imide groups providing improved chemical stability and mechanical strength and the remaining amic acid groups are converted into amic ester groups imparting good solubility in organic solvents.

SUMMARY OF THE INVENTION

Therefore, it is an object of the present invention to provide, as a prepolymer for polyimide, poly(imide-amic ester) having improved chemical stability and mechanical strength with good solubility in organic solvents.

It is another object of the invention to provide a process for preparing said poly(imide-amic ester).

It is another object of the invention to provide a process for preparing a polyimide from said poly(imide-amic ester) with excellent processibility.

It is yet another object of the invention to provide a process for preparing a polyimide film having excellent heat resistance and insulating properties.

It is yet another object of the present invention to provide a process for preparing a polyimide fiber having excellent heat resistance and insulating properties.

DETAILED DESCRIPTION OF THE INVENTION

Figure 1:
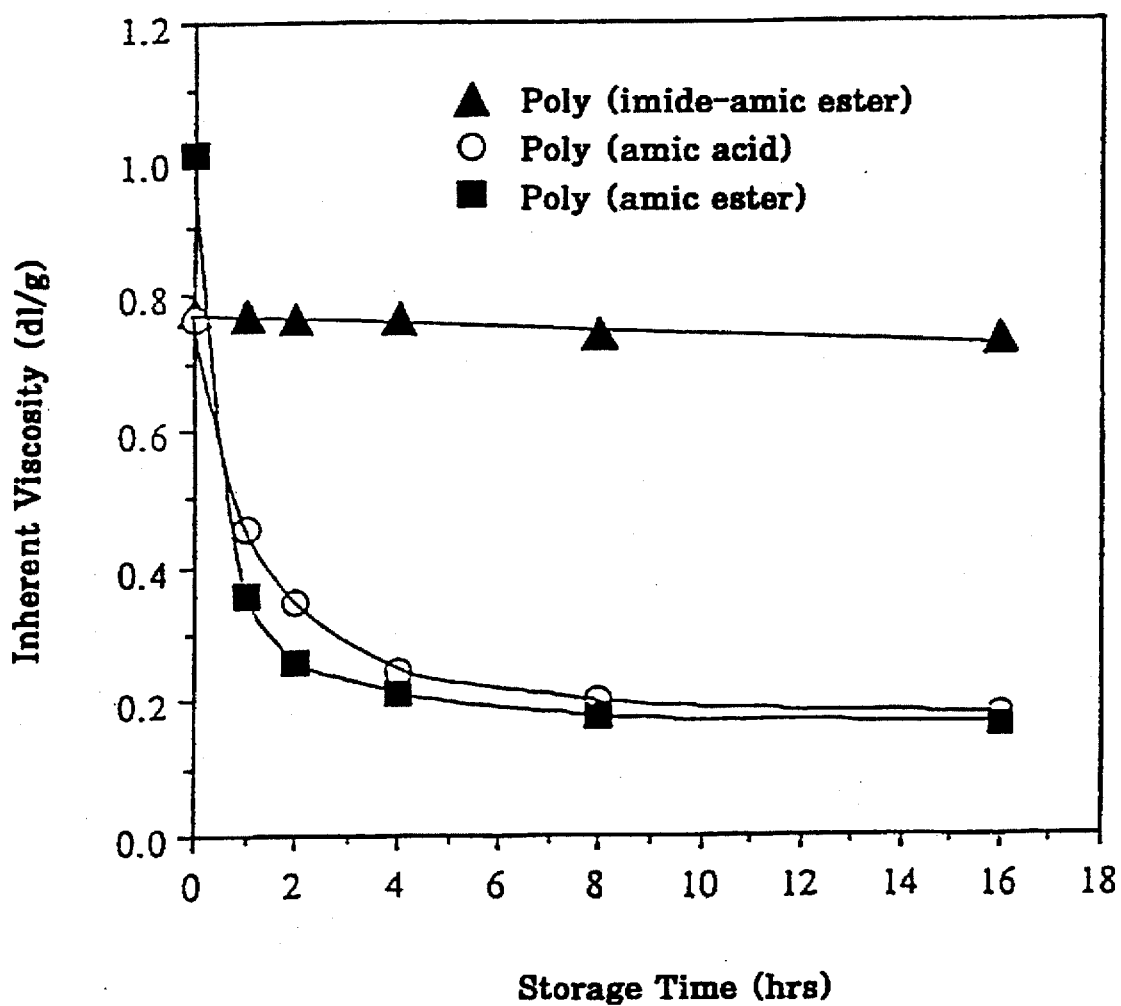
FIG. 1 graphically represents a change in an inherent viscosity with time when each of three polyimide prepolymers is stored in a solution of 0.5 g/dl at a temperature of 80° C.

The present invention provides poly(imide amic ester) having repeating unit of formula:

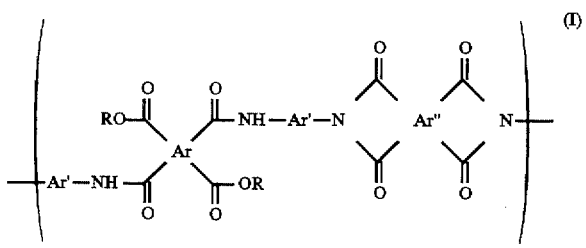

wherein
Ar is

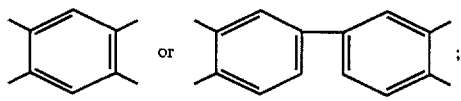

Ar' is

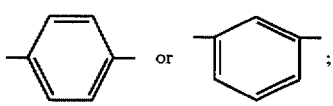

Ar" is

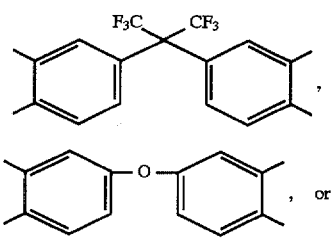

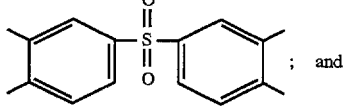

R represents $C_{1-4}$ alkyl, such as $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$.

The poly(imide amic ester) of the invention can be isolated as a solid state using conventional separation techniques such as reprecipitation. The poly(imide-amic ester) of the invention is found to have little change in physical properties caused by penetration of moisture and/or heat treatment during the solution processing procedures.

The poly(imide amic ester) according to the invention may generally have a number-average molecular weight of 10,000 to 500,000, as measured using gel permeation chromatography (GPC).

Poly(imide amic ester) according to the invention has an inherent viscosity of 0.2 to 2.0 g/dl as measured in a 0.5 g/l solution in NMP, and has found to have excellent chemical stability because it has no amic acid groups in chains.

The poly(imide amic ester) which has been isolated as a solid state according to the invention has excellent solubility in various organic solvents such as N,N-dimethylformamide (DMF), N,N-dimethylacetamide (DMAc), N-methylpyrrolidone (NMP), dimethylsulfoxide (DMSO), tetrahydrofuran (THF) and dioxane, and mixtures thereof. Thus, a solution having a concentration of up to 70 wt parts can be prepared for film casting or spinning. The selection from a variety of solvents depends on the type of the desired products and the processing conditions.

According to the present invention, a process is also provided for preparing the poly(imide amic ester) of formula (I) above, which comprises reacting a diamine monomer of formula:

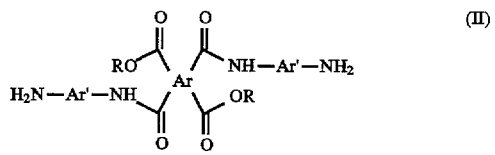

wherein Ar, Ar' and R are the same as defined above, with an aromatic tetracarboxylic dianhydride of formula:

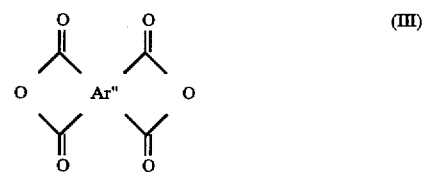

wherein Ar" is the same as defined above, in an organic solvent to give poly(amic acid ester) having repeating unit of formula:

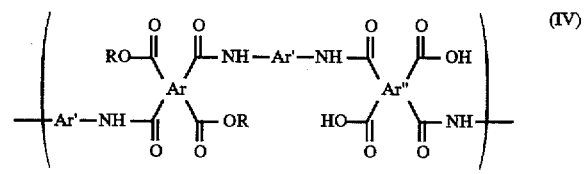

wherein Ar, Ar', Ar" and R are the same as defined above; reacting the poly(amic acid ester) with a chemical imidating agent; and optionally, separating the resulting poly(imide amic ester) in a solid state, if a solid poly(imide amic ester) is required.

The poly(imide amic ester) prepared by polymerization of the diamine monomer of formula (II) and the tetracarboxylic acid dianhydride monomer of formula (III) contains repeating units of the formula (I) above, in which Ar in formula (II) and Ar" of formula (III) are alternately present at both sides of phenylene diamine represented by Ar'.

The diamine monomer and the aromatic tetracarboxylic dianhydride monomer are sequentially added in equimolar mounts in a organic solvent. The polymerization reaction is carded out with stirring at a temperature of 0° to 80° C. for 30 min. to 24 hrs. to give a solution of poly(amic acid ester) of formula(IV). Then, an chemical imidating agent is added to the resulting solution, followed by stirring for 0.5 to 10 hrs. at a temperature of 0° to 90° C. Then, a solvent such as water, methanol or mixtures thereof is added to the solution with stirring. The solution is filtered and dried to obtain poly(imide amic ester) having repeating unit of formula(I) above.

Organic solvents which can be used in the polymerization of the diamine monomer (II) and the tetracarboxylic acid dianhydride monomer (ill) include polar organic solvents such as N,N-methylpyrrolidone, N,N-dimethylacetamide, N,N-dimethyl-formamide, dimethylsulfoxide or the like.

Diamine monomers listed in Table 1 below can be used in the preparation of poly(imide amic ester) according to the present invention. In Table 1, the term "alkyl" means $C_{1-4}$ alkyl as defined for R in formula (I) above.

Tetracarboxylic dianhydride monomers listed in Table 2 below can be used in the preparation of poly(imide amic ester) according to the present invention.

TABLE 2

| Formula III Ar" | tetracarboxylic dianhydride |
| --- | --- |
| [structure] | 4,4'-oxydiphthalic dianhydride |

TABLE 2-continued

| Formula III Ar" | tetracarboxylic dianhydride |
| --- | --- |
| [structure with SO2] | diphenylsulfone-3,3',4,4'-tetracarboxylic dianhydride |
| [structure with C(CF3)2] | 4,4'-(hexafluoroisopropylidene)-diphthalic dianhydride |

Poly(imide amic ester) having repeating units of the formula (I) according to the present invention may have a variety of structures, depending on the combination of the diamine and the tetracarboxylic dianhydride monomers. Also, the poly(imide amic ester) according to the present invention has different physical properties depending on the structure.

In the polymerization reaction of the diamine monomer (II) and the tetracarboxylic acid dianhydride monomer (III), the content of solid, which equals to the sum of weights of the diamine and aromatic tetracarboxylic dianhydride monomers used, is adjusted so as to be about 2 to about 40 wt. % based on the weight of the organic solvent used.

Formula (II)

| Ar | Ar' | diamine |
| --- | --- | --- |
| [phenylene] | [phenylene] | N,N'-bis(4-aminophenyl)-2,5-bis(alkyloxycarbonyl)benzene-1,4-dicarboxyamide |
| [phenylene] | [phenylene] | N,N'-bis(3-aminophenyl)-2,5-bis(alkyloxycarbonyl)benzene-1,4-dicarboxyamide |
| [biphenylene] | [phenylene] | N,N'-bis(4-aminophenyl)-4,4'(4,3' or 3,3')-bis(alkyloxycarbonyl)biphenyl-3,3'(3,4' or 4,4')-dicarboxyamide |
| [biphenylene] | [biphenylene] | N,N'-bis(4-aminophenyl)-4,4'(4,3' or 3,3')-bis(alkyloxycarbonyl)biphenyl-3,3'(3,4' or 4,4')-dicarboxyamide |

The chemical imidating agents which can be used in the chemical imidation of poly(amic acid ester) include tertiary amines and acetic anhydride. It is required that tertiary amines be added prior to acetic anhydride.

Acetic anhydride is added in an amount of 1.5 to 2.4 equivalents based on the diamine used. If acetic anhydride is used in an amount of more than 2.4 equivalents, excessive imidation may occur, resulting in lowering of the solubility of the product.

As tertiary amines, triethylamine may be used alone or in combination with pyridine. If triethylamine is used alone, the imidation reaction is sufficiently carried out at a temperature of 0° to 90° C. for 30 min. to 5 hrs. If triethylamine is used in combination with pyridine as a tertiary amine, it is required that the mixture of triethylamine and pyridine is used in such an amount that the sum of equivalents of the two tertiary mines used exceeds the 1.5-fold amounts of the diamine monomer used and that the imidation reaction is carried out at a temperature of 0° to 90° C. for 0.5 to 10 hrs. If the amount of the tertiary amine is less than 1.5-fold amounts of the diamine monomer amount, the degree of imidation may be insufficient, and the selectivity of imidation may also be reduced. Pyridine may be added in an amount of not more than 99 times based on the molar amounts of triethylamine used.

The degree of imidation of the prepared poly(imide amic ester) can be determined using proton nuclear magnetic resonance spectrum analysis. If the amount of acetic anhydride is less than 2 equivalents based on an amount of the diamine monomer used or if the reaction is carried out at a temperature of no more than 45° C., the degree of imidation is measured at 45 to 50%. Otherwise, the degree of imidation is measured at 50 to 60%. Unlike other prepolymers for polyimides, such control of the degree of imidation of 45 to 60% of the poly(imide amic ester) according to the present invention allows for the poly(imide antic ester) prepolymer of the invention to have similar physical properties to those of polyimides, in terms of mechanical strength, heat stability, and the like. Film casting or coating of a solution of poly(imide amic ester) of the invention followed by drying can provide a stable film or thin coat. Also, the poly(imide amic ester) solution per se may be easily subjected to subsequent processings such as spinning and drawing.

According to another aspect of the invention, a process is provided for preparing polyimide having repeating units of formula:

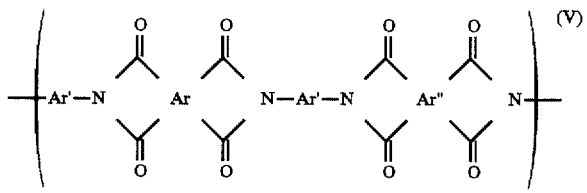

wherein Ar, Ar', Ar" and R are the same as defined above, which comprises:

providing a solution of poly(imide amic ester) having repeating units of the formula (I) in an organic solvent;

subjecting the resulting poly(imide amic ester) solution to thermal imidation by heating at a temperature of above 240° C.

The polyimide prepared by the above process may generally have a number-average molecular weight of 10,000 to 200,000, as measured using gel permeation chromatography.

According to another aspect of the invention, a process is provided for preparing a film of polyimide having repeating units of formula:

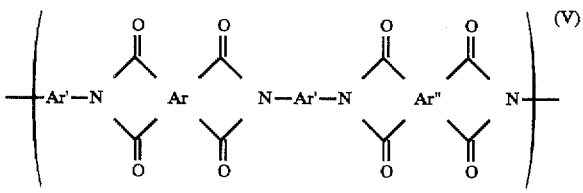

wherein Ar, Ar', Ar" and R are the same as defined above, which comprises:

dissolving solid poly(imide amic ester) having repeating units of the formula (I) above in an organic solvent to form a solution;

casting or coating the resulting solution on a solid support;

drying the resulting film or coating at a temperature of 20° to 150° C. to give a poly(imide amic ester) film or coat; and subjecting the resulting poly(imide amic ester) film or coat to thermal imidation by heating at a temperature of above 240° C.

The poly(imide amic ester) solution is prepared so as to have a concentration of below 70 parts by weight, preferably not more than 40 parts by weight. Examples of organic solvents which can be used in the preparation of the poly (imide amic ester) solution include tetrahydrofuran, N-methylpyrrolidone, N,N-dimethylformamide, N,N-dimethylacetamide, dimethylsulfoxide, dioxane or the mixtures thereof. The drying step is carried out at a temperature of 20° to 150° C., preferably under forced-air circulation or under reduced pressure to give a partially- or wholly-dried film of poly(imide antic ester). The term "partially-dried" is used herein to mean that some of the organic solvent fried remains in the resulting in an amount of not more than 30% based on the weight of the film.

The thermal imidation of the poly(imide antic ester) film or coating is carried out by heating while it is laid on a support or not .supported, to a temperature of from the upper drying temperature of 150° C. to about 240°–450° C. at a heating rate of 1°–20 C. per minute, or by stepwise heating it at a temperature of from about 150° to about 450° C. The thermal imidation of the poly(imide amic ester) film gives a film of polyimide having the repeating units of formula (V) through imidation of amic ester groups in the poly(imide amic ester) with release of alcohol.

Alternatively, the polyimide film can be prepared by directly subjecting the poly(imide amic ester) solution formed immediately after chemical imidation without isolation of poly(imide amic ester) in a solid state to film casting or coating on a solid support, drying the resulting poly(imide amic ester) film or coat at about 20°–150° C., and then subjecting the poly(imide amic ester) film or coat to thermal imidation by heating it at a temperature of above 240° C.

The drying step is similarly carried out as in the process for preparing a polyimide film from a solid poly(imide amic ester) mentioned above.

The thermal imidation of the poly(imide amic ester) film or coat is similarly carried out as in the process for preparing a polyimide film from a solid poly(imide amic ester) mentioned above.

A poly(imide amic ester) film usually has a degree of imidation of above 50% when the film was prepared by direct film casting of the solution formed immediately after chemical imidation without isolation of poly(imide amic ester) as a solid state.

At a temperature of less than 240° C., the poly(imide amic ester) film shows good mechanical strength, and can be used as raw material for the preparation of end products which will be used at a temperature of less than 240° C.

The poly(imide amic ester) of the invention may undergo thermal imidation at a temperature of about 240° to about 330° C. in the absence of organic solvents. In order to prepare a product from poly(imide amic ester), a solution formed therefrom should be dried at a temperature of less than 240° C.

It is believed that the thermal imidation of the poly(imide amic ester) film by heating at a temperature of above 240° C. gives a polyimide film with releasing alcohol molecules from amic ester groups. The thermal imidation of a poly (imide amic ester) film generally requires excessive heat treatment. If a prepolymer for polyimide having amine end groups which are unstable to oxidation is used, opaque polyimide having deteriorated physical properties will be obtained. The poly(imide amic ester) according to the present invention has capped amine end groups by reacting amine end groups with acetic anhydrides through chemical imidation. Since the present invention provides a polyimide film prepared by heating a poly(imide amic ester) having capped amine end groups, oxidation of amine end groups is hindered, and thus, a polyimide film having excellent transparency and improved electrical and mechanical properties is obtained.

The polyimide film according to the present invention has improved physical properties due to high molecular ordering of rigid aromatic imide units in poly(imide amic ester), and therefore, can be used in a free-standing state or in a coated state attached on a substrate.

Moreover, since the poly(imide amic ester) solution of the present invention has the high molecular ordering effect of rigid aromatic imide units of poly(imide amic ester) in the "partially-dried" state, it is possible to prepare a polyimide fiber from the poly(imide amic ester).

According to the present invention, a process is provide for preparing a polyimide fiber having repeating units of formula

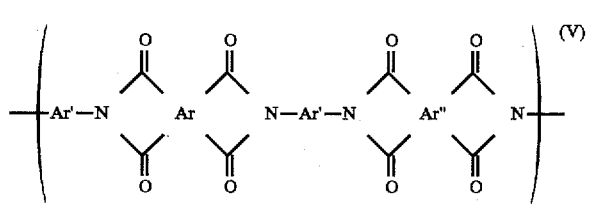

wherein Ar, Ar', Ar", and R are the same as defined above, which comprises:

dry- or wet-spinning of a solution of poly(imide amic ester) having repeating units of the formula (I) above in an organic solvent with more than 10 wt. % concentration to form a fiber, drying the fiber at a temperature of 20° C. to 150° C. or passing through a non-solvent area, and heating the resulting fiber to a temperature of 240° C. to 450° C. concurrently with or after drawing.

Poly(imide amic ester) according to the present invention may also be used in the preparation of a blend of polymers. The blend of polymers can be prepared by forming a solution of poly(imide amic ester) according to the present invention in an organic solvent as specified above, mixing the solution with heat-resistant polymers having solubility in an organic solvent and compatibility with poly(imide amic ester), such as polyamic acid, polyamic ester, polyimide, polyamide, poly(imide amide), polyetherimide, polyesterimide, polyester, and prepolymers thereof, and heating the mixture to at least 240° C. to give a blend of polyimide-polyimide or a blend of polyimide-other polymers.

The present invention will be particularly described in Examples and Comparative Examples. However, the present invention is not intended to be limited by the Examples.

EXAMPLE 1

Preparation of Poly(imide amic ester)

250 ml of N-methylpyrrolidone and 10,000 g (19.28 mmol) of N,N'-bis(4-aminophenyl)-2,5-bis (isopropyloxycarbonyl)benzene-1,4-dicarboxyamide were added in 500 ml round bottom flask equipped with a mechanical stirrer and a nitrogen flow tube.

8.567 g(19.28mmol) of 4,4'-(hexafluoroisopropylidene) diphthalic dianhydride was added in proportions with stirring while passing a flow of nitrogen gas and stirred for 3 hrs. A viscous solution of polyamic ester was obtained.

2.50 ml (30.85 retool) of pyridine and 1.10 ml (7.71 mmol) of triethylamine were added and 3.64 ml(38.57 retool) of acetic anhydride were added to the stirred solution of polyamic ester. Then, the reaction was stirred for 2 hrs. while maintaining 50° to 60° C. in a water bath. A solution of poly(imide amic ester) was obtained. The solution was slowly decanted to a mixture of ethanol/methanol(2:1) with stirring. The resulting precipitate was filtrated, washed with methanol, and dried under reduced pressure to give the lifted compound (98.5%) as a pale-yellow fibrous solid.

The compound had an inherent viscosity of 1.03 dl/g. From Differential Scanning Calorimetry (DSC) analysis, glass transition temperature was not observed and a peak was observed at a temperature of 240° C. to 330° C. The peak is considered to be caused by endothermic imidation of the amic ester group.

Thermogravimetric analysis (TGA) showed that a reduction in weight occurred by 12.5% at a temperature of 240° to 330° C.

EXAMPLES 2 to 24

Poly(imide amic ester) was prepared in the same manner as Example 1 except that the reactants and the conditions were changed as given in Table 3 below. The viscosity was measured at a temperature of 30° C. using Ubbelohde viscosimeter.

The abbreviations are as follows:

4AIBD: N,N'-bis(4-aminophenyl)-2,5-bis (isopropyloxycarbonyl)benzene-1,4-dicarboxyamide;

4AEBD: N,N'-bis(4-aminophenyl)-2,5-bis (ethyloxycarbonyl)benzene-1,4-dicarboxyamide;

3AIBD: N,N'-bis(3-aminophenyl)-2,5-bis (isopropyloxycarbonyl)benzene-1,4-dicarboxyamide;

3AEBD: N,N'-bis(3-aminophenyl)-2,5-bis (ethyloxycarbonyl)benzene-1,4-dicarboxyamide;

4AIPD: N,N'-bis(4-aminophenyl)-4,4'(4,3' or3,3')-bis (isopropyloxycarbonyl)-biphenyl-3,3'(3,4' or 4,3')-dicarboxyamide;

4AEPD: N,N'-bis(4-aminophenyl)-4,4'(4,3' or 3,3')-bis (ethyloxycarbonyl)-biphenyl-3,3'(3,4' or 4,3')-dicarboxyamide;

4AIPD: N,N'-bis(4-aminophenyl)-4,4'(4,3' or3,3')-bis (isopropyloxycarbonyl)-biphenyl-3,3'(3,4' or 4,3')-dicarboxyamide;

3AEPD: N,N'-bis(3-aminophenyl)-4,4'(4,3' or 3,3')-bis (ethyloxycarbonyl)-biphenyl-3,3'(3,4' or 4,3')-dicarboxyamide;

6FDA: 4,4'-(hexafluoroisopropylidene)diphthalic dianhydride;

DSDA: diphenylsulfone-3,3',4,4'-tetracarboxylic dianhydride;

ODPA: 4,4'-oxydiphthalic dianhydride.

TABLE 3

| Example No. | diamine | tetra-carboxylic dianhydride | pyridine/triethylamine (molar ratio) | reaction temperature (°C.) | reaction time (hr.) | viscosity (dl/g) |
|---|---|---|---|---|---|---|
| 2 | 4AIBD | ODPA | 19:1 | 45~50 | 1 | 1.01 |
| 3 | 4AIBD | DSDA | 4:1 | 50~60 | 2 | 0.90 |

TABLE 3-continued

| Example No. | diamine | tetra-carboxylic dian-hydride | pyridine/ triethylamine (molar ratio) | reaction temperature (°C.) | reaction time (hr.) | viscosity (dl/g) |
|---|---|---|---|---|---|---|
| 4 | 4AEBD | 6FDA | 0:1 | 50~60 | 3 | 1.11 |
| 5 | 4AEBD | DSDA | 1:1 | 55~60 | 1 | 0.87 |
| 6 | 4AEBD | ODPA | 4:1 | 40~45 | 2 | 1.00 |
| 7 | 3AIBD | 6FDA | 1:1 | 50~60 | 5 | 0.55 |
| 8 | 3AIBD | DSDA | 4:1 | 50~60 | 3 | 0.48 |
| 9 | 3AIBD | ODPA | 9:1 | 55~60 | 6 | 0.53 |
| 10 | 3AEBD | 6FDA | 4:1 | 55~60 | 3 | 0.57 |
| 11 | 3AEBD | DSDA | 19:1 | 55~60 | 2 | 0.50 |
| 12 | 3AEBD | ODPA | 0:1 | 50~60 | 4 | 0.46 |
| 13 | 4AIPD | 6FDA | 4:1 | 50~60 | 2 | 0.81 |
| 14 | 4AIPD | DSDA | 19:1 | 55~60 | 3 | 0.75 |
| 15 | 4AIPD | ODPA | 9:1 | 45~60 | 1 | 0.93 |
| 16 | 4AEPD | 6FDA | 0:1 | 50~60 | 3 | 0.80 |
| 17 | 4AEPD | DSDA | 4:1 | 50~60 | 2 | 0.74 |
| 18 | 4AEPD | ODPA | 9:1 | 45~50 | 1 | 0.77 |
| 19 | 4AIPD | 6FDA | 4:1 | 50~60 | 2 | 0.44 |
| 20 | 4AIPD | DSDA | 4:1 | 50~60 | 5 | 0.45 |
| 21 | 4AIPD | ODPA | 9:1 | 50~60 | 2 | 0.52 |
| 22 | 3AEPD | 6FDA | 4:1 | 50~60 | 5 | 0.50 |
| 23 | 3AEPD | DSDA | 4:1 | 55~60 | 2 | 0.49 |
| 24 | 3AEPD | ODPA | 9:1 | 50~60 | 2 | 0.47 |

EXAMPLE 25

This Example was carried out in order to compare chemical stability of the prepolymers for polyimide, i.e., poly(amic acid ester), poly(amic acid) and poly(imide amic ester)

poly(imide amic ester) and polyamic ester prepared in Example 1 were used.

Poly(amic acid ester) was prepared as follows. 4.205 g (19.28 mmol) of pyromellitic dianhydride was added to 250 ml of N-methylpyrrolidone in 500 ml round bottom flask equipped with a mechanical stirrer and a nitrogen flow tube. 8.567 g(19.28 mmol) of 4,4'-(hexafluoroisopropylidene) diphthalic dianhydride was added in proportions with stirring while passing a flow of nitrogen gas and stirred for 3 hrs. A solution of poly(amic acid) was obtained.

Each of poly(amic acid) and poly(amic acid ester) was diluted with N-methylpyrrolidone to prepare a solution at a concentration of 0.5 g/dl. 0.5 g of poly(imide amic ester) was dissolved in N-methylpyrrolidone to make a final volume of 1 dl (100 ml).

For each solution, a volume of 20 ml per ampule was charged to prepare five ampules. Then, the ampules were cooled in liquid nitrogen under reduced pressure, sealed and stored for 2 hrs. in a oven at 80° C. For each solution, an ampule was removed at each time point after 1, 2, 4, 8 and 16 hrs. The viscosity was measured. The viscosity of three solutions was measured at a temperature of 30° C. using Ubbelohde viscosimeter.

Poly(imide amic ester) according to the present invention exhibits little or no change in viscosity before and after storage, while poly(amic acid) and poly(amic acid ester) after storage exhibit a reduced viscosity to no more than half of the initial value. The data are shown in FIG. 1. As shown from the data, poly(imide amic ester) had excellent chemical stability.

EXAMPLE 26

Preparation of a film of polyimide 2 g of poly(imide amic ester) prepared in Example 1 was dissolved in 10 ml of N,N-dimethylformamide. The solution was cast onto a glass plate and dried for hr. at 80° C. in a air forced circulation oven. The temperature was raised to 150° C. at a rate of 10° C./min. and further drying was carded out for 1 hr. at the same temperature. Then, the resultant product was heated to 350° C. at a rate of 2° C./min. A pale-yellow transparent film of polyimide having a thickness of 20 μm was obtained.

TGA showed that a reduction in weight occurred by 5% at a temperature of 570° C. DSC analysis showed that glass transition temperature was not observed at a temperature of not more than 450° C.

EXAMPLES 27 TO 29

Polyimide films were prepared in the same manner as Example 26 except that poly(imide amic ester) prepared in Examples 2 to 24 was used and the conditions were changed as given in Table 4.

The abbreviations are as follows:

NMP: N-methylpyrrolidone
DMF: N,N-dimethylformamide
THF: tetrahydrofuran
DMSO: dimethylsulfoxide
DMAC: N,N-dimethylacetamide

TABLE 4

| Example No. | resin (Example No.) | casting solvent | Maximum Temperature for imidation (°C.) |
|---|---|---|---|
| 27 | 2 | NMP | 400 |
| 28 | 3 | DMSO | 400 |
| 29 | 4 | NMP | 400 |
| 30 | 5 | NMP | 400 |
| 31 | 6 | NMP | 400 |
| 32 | 7 | THF | 350 |
| 33 | 8 | DMF | 400 |
| 34 | 9 | DMF | 400 |
| 35 | 10 | THF | 350 |
| 36 | 11 | DMAC | 350 |
| 37 | 12 | DMF | 350 |
| 38 | 13 | 1,4-DIOXANE | 350 |
| 39 | 14 | DMF | 400 |
| 40 | 15 | DMF | 350 |
| 41 | 16 | DMF | 300 |
| 42 | 17 | NMF | 350 |
| 43 | 18 | DMF | 350 |
| 44 | 19 | THF | 300 |
| 45 | 20 | DMF | 400 |
| 46 | 21 | DMF | 370 |
| 47 | 22 | DMF | 370 |
| 48 | 23 | DMF | 350 |
| 49 | 24 | NMP | 350 |

EXAMPLE 50

Preparation of a fiber of polyimide 2 g of poly(imide amic ester) prepared in Example 1 was dissolved in 10 ml of N,N-dimethylformamide. The solution was spun through a spinneret of a 0.5 mm diameter into a mixed solution of methanol and water (50:50 v/v) at room temperature with a pressure of 14 psi to obtain a fiber. The fiber was dried for 12 hrs. in a vacuum oven and then heated gradually at 80° C. for 3 hrs., at 130° C. for 1 hr., at 170° C. for 1 hr., at 250° C. for 2 hrs. and at 350° C. for 3 hrs. with a drawing ratio of 350%.

The resulting fiber showed best tenacity of 123 g/d. TGA showed that a reduction in weight occurred by 5% at a temperature of 570° C. DSC analysis showed that the glass transition temperature was not observed at a temperature of not more that 450° C.

EXAMPLES 51 TO 73

Polyimide fibers were prepared in the same manner as Example 50 except that poly(imide amic ester) prepared in Examples 2 to 24 was used and the conditions were changed as given in Table 5.

The abbreviations are as follows:

NMP: N-methylpyrrolidone
DMF: N,N-dimethylformamide
THF: tetrahydrofuran
DMSO: dimethylsulfoxide
DMAC: N,N-dimethylacetamide

TABLE 5

| Example No. | resin (Example No.) | casting solvent | Maximum Temperature for imidation (°C.) |
|---|---|---|---|
| 51 | 2 | NMP | 400 |
| 52 | 3 | DMSO | 400 |
| 53 | 4 | NMP | 400 |
| 54 | 5 | NMP | 400 |
| 55 | 6 | NMP | 400 |
| 56 | 7 | THF | 350 |
| 57 | 8 | DMF | 400 |
| 58 | 9 | DMF | 400 |
| 59 | 10 | THF | 350 |
| 60 | 11 | DMAC | 350 |
| 61 | 12 | DMF | 350 |
| 62 | 13 | 1,4-DIOXANE | 350 |
| 63 | 14 | DMF | 400 |
| 64 | 15 | DMF | 350 |
| 65 | 16 | DMF | 300 |
| 66 | 17 | NMF | 350 |
| 67 | 18 | DMF | 350 |
| 68 | 19 | THF | 300 |
| 69 | 20 | DMF | 400 |
| 70 | 21 | DMF | 370 |
| 71 | 22 | DMF | 370 |
| 72 | 23 | DMF | 350 |
| 73 | 24 | NMP | 350 |

What is claimed is:

1. A poly(imide amic ester) having repeating unit of formula:

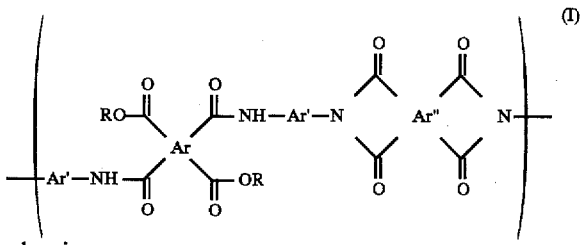

wherein
Ar is

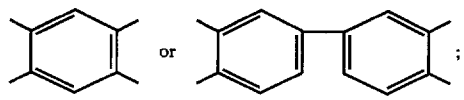

Ar' is

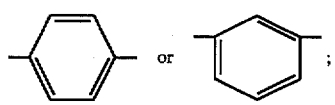

Ar" is

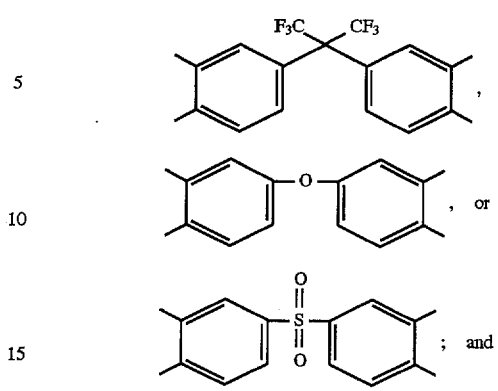

R represents $C_{1-4}$ alkyl, such as $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$.

2. A process for preparing the poly(imide amic ester) of formula (I) above, which comprises reacting a diamine monomer of formula:

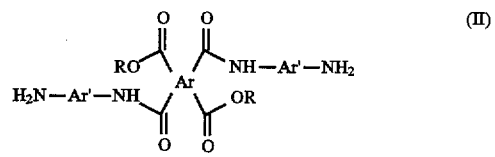

wherein Ar, Ar' and R are the same as defined in claim 1, with an aromatic tetracarboxylic dianhydride of formula:

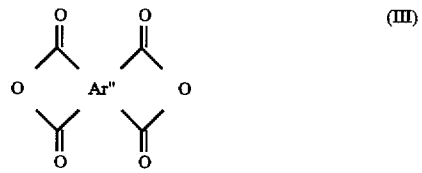

wherein Ar" is the same as defined in claim 1, in an organic solvent to give poly(amic acid ester) having repeating unit of formula:

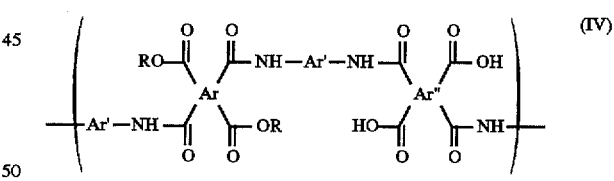

wherein Ar, Ar', Ar" and R are the same as defined above; and reacting the poly(amic acid ester) with a chemical imidating agent.

3. The process according to claim 2, wherein said diamine monomer of formula(II) is selected from the group consisting of N,N'-bis(4-aminophenyl)-2,5-bis(alkyloxycarbonyl) benzene-1,4-dicarboxyamide, N,N'-bis(3-aminophenyl)-2,5-bis-(alkyloxycarbonyl) benzene-1,4-dicarboxyamide, N,N'-bis(4-aminophenyl)-4,4'(4,3' or 3,3')-bis (alkyloxycarbonyl)biphenyl-3,3'(3,4' or 4,4')-dicarboxyamide and N,N'-bis(4-aminophenyl)-4,4'(4,3' or 3,3')-bis(alkyloxycarbonyl)biphenyl-3,3'(3,4' or 4,4')-dicarboxyamide.

4. The process according to claim 2, wherein said aromatic tetracarboxylic dianhydride of formula (III) is selected from the group consisting of 4,4'-oxydiphthalic dianhydride, diphenylsulfone-3,3',4,4'-tetracarboxylic dianhydride and 4,4'-(hexafluoroisopropylidene)diphthalic dianhydride.

5. The process according to claim 2, wherein said organic solvent is selected from the group consisting of tetrahydrofuran, N-methylpyrrolidone, N,N-dimethylformamide, N,N-dimethyl- acetamide, dimethylsulfoxide, dioxane or the mixtures thereof.

6. The process according to claim 2, wherein the chemical imidating agent is tertiary amines or a mixture thereof in an amount of no less than 1.5 equivalents and acetic anhydride in an amount of 1.5 to 2.4 equivalents, based on the diamine used.

7. The process according to claim 2, wherein the chemical imidation is carded out for 0.5 to 10 hrs. at a temperature of 0° to 90° C.

8. The process according to claim 2, which further comprises isolating the resulting poly(imide amic ester) as a solid state using reprecipitation.

9. The process according to claim 6, wherein the tertiary amine is triethylamine alone or in combination with pyridine.

10. A process for preparing polyimide having repeating units of formula:

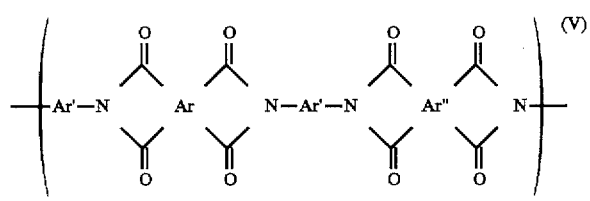

wherein Ar is

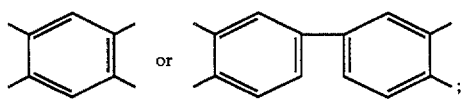

Ar' is

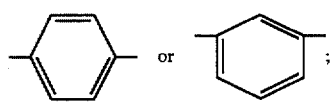

Ar" is

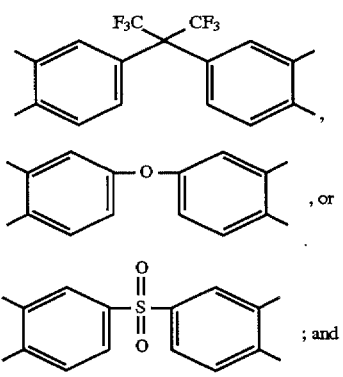

R is a $C_{1-4}$ alkyl, selected from the group consisting of $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$, said process comprising:

providing a solution of poly(imide amic ester) having repeating units of formula (I) in an organic solvent; wherein formula (I) is

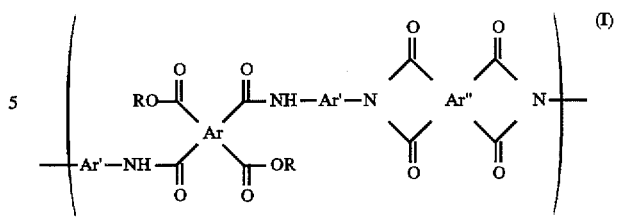

wherein Ar, Ar', Ar" and R are the same as defined above; and subjecting the resulting poly(imide amic ester) solution to thermal imidation by heating at a temperature of above 240° C.

11. The process according to claim 10, wherein the solution of poly(imide amic ester) is provided by dissolving a solid poly(imide amic ester) as defined by formula (I) in an organic solvent.

12. A process for preparing a film of polyimide having repeating units of formula:

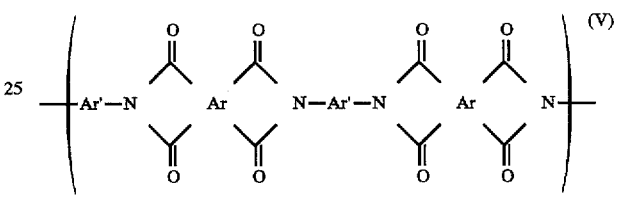

wherein Ar is

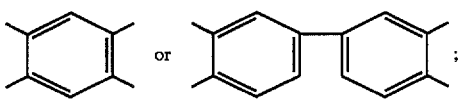

Ar' is

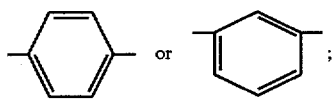

Ar" is

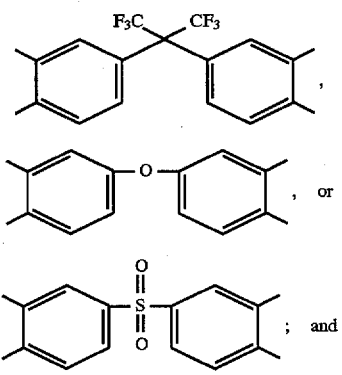

R is a $C_{1-4}$ alkyl, selected from the group consisting of $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$, said process comprising:

providing a solution of poly(imide amic ester) having repeating units of formula (I) in an organic solvent; wherein formula (I) is

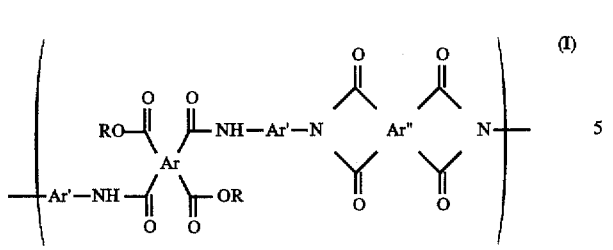

wherein Ar, Ar', Ar" and R are the same as defined above;

casting or coating the resulting solution on a solid support;

drying the resulting film or coat at a temperature of 20° to 150° C. to give a poly(imide amic ester) film or coat; and subjecting the resulting poly(imide amic ester) film or coat to thermal imidation by heating at a temperature of above 240° C.

13. The process according to claim 12, wherein the solution of poly(imide amic ester) is provided by dissolving a solid poly(imide amic ester) as defined by formula (I) in an organic solvent.

14. The process according to claim 12, wherein said organic solvent is selected from the group consisting of tetrahydrofuran, N-methylpyrrolidone, N,N-dimethylformamide, N,N-dimethyl- acetamide, dimethylsulfoxide, dioxane or the mixtures thereof.

15. The process according to claim 12, wherein the partially-drying is carried out at a temperature of 20° C. to 150° C. under forced-air circulation or under reduced pressure.

16. The process according to claim 12, wherein the thermal imidation of the poly(imide amic ester) film or coat is carried out by heating it, as it is attached to the support or as it is removed from the support, to a temperature of from the upper drying temperature of 150° C. to about 240°–450° C. at a heating rate of 1°–20° C. per minute, or by stepwise heating it at a temperature of from about 150° C. to about 450° C.

17. A process for preparing a fiber of polyimide having repeating units of formula:

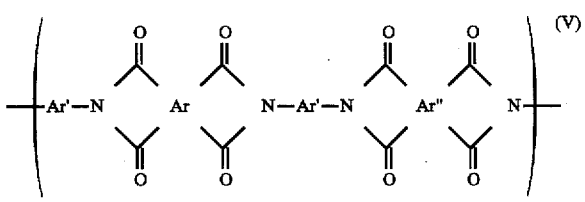

wherein Ar is

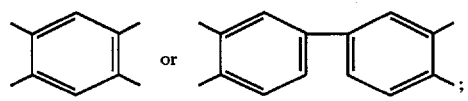

Ar' is

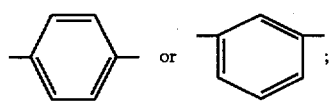

Ar" is

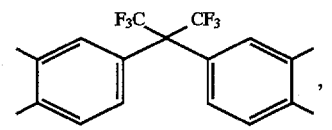

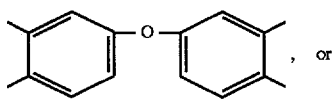

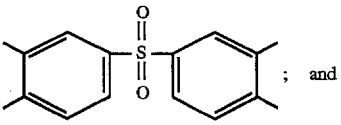

R is a $C_{1-4}$ alkyl, selected from the group consisting of $CH_3$, $CH_2CH_3$, $CH(CH_3)_2$, $CH_2CH_2CH_3$, $CH_2CH_2CH_3CH_3$, $CH_2CH(CH_3)_2$ and $C(CH_3)_3$, said process comprising:

dry- or wet-spinning of a solution of poly(imide amic ester) having repeating units of formula (I) in an organic solvent to form a fiber; wherein formula (I) is

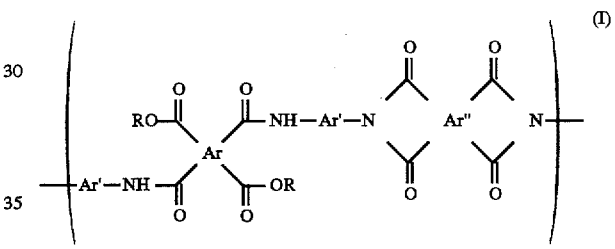

wherein Ar, Ar', Ar" and R are the same as defined above;

drying the fiber at a temperature of 20° C. to 150° C. or passing through a non-solvent area; and heating the fiber to a temperature of 240° C. to 450° C. concurrently with or after drawing.

18. The process according to claim 17, wherein the solution of poly(imide amic ester) is provided by dissolving a solid poly(imide amic ester) as defined by formula (I) in an organic solvent.

19. The process according to claim 17, wherein said drawing is carried out at a temperature of 20° C. to 250° C. at a draw ratio of no more than 600%.

20. The process according to claim 17, wherein said heating is carried out at a heating rate of 1°–20° C./min. while slowly increasing the drawing ratio.

21. The process according to claim 10, wherein the solution of poly(imide amic ester) is provided by direct use of a solution of poly(imide amic ester) of formula (I) prepared by reacting a diamine monomer of the formula:

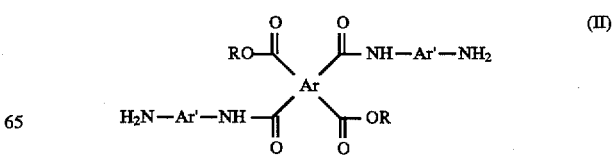

wherein Ar is

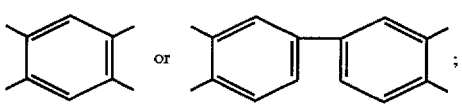

Ar' is

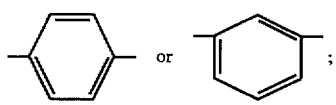

and R is a $C_{1-4}$ alkyl, selected from the group consisting of $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$;

with an aromatic tetracarboxylic dianhydride of formula

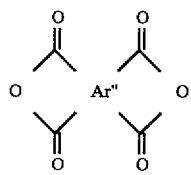

(III)

wherein Ar" is

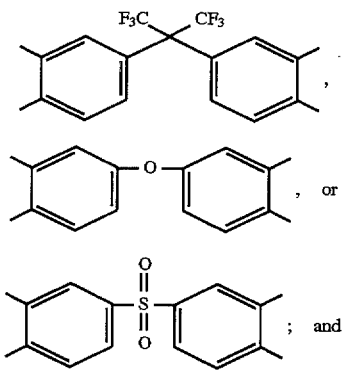

wherein said reaction between the diamine monomer and aromatic tetracarboxylic dianhydride takes place in an organic solvent to provide a poly(amic acid ester) having repeating units of formula

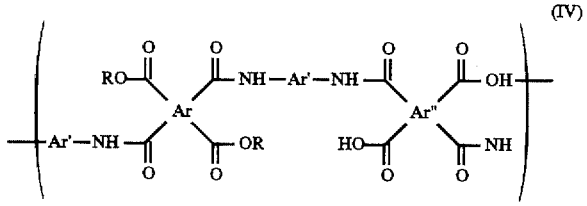

(IV)

wherein Ar, Ar', and Ar" and R are the same as defined above; and reacting the poly(amic acid ester) with a chemical imidating agent.

22. The process according to claim 12, wherein the solution of poly(imide amic ester) is provided by direct use of a solution of poly(imide amic ester) of formula (I) prepared by reacting a diamine monomer of the formula:

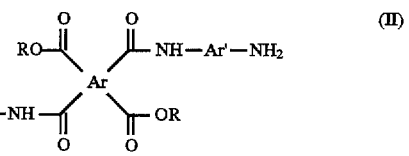

(II)

wherein Ar is

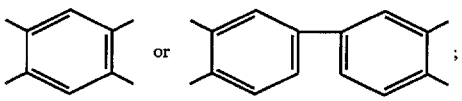

Ar' is

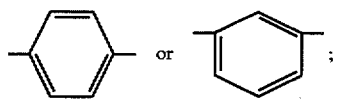

and R is a $C_{1-4}$ alkyl, selected from the group consisting of $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$;

with an aromatic tetracarboxylic dianhydride of formula

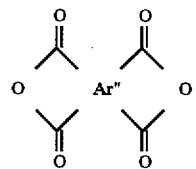

(III)

wherein Ar" is

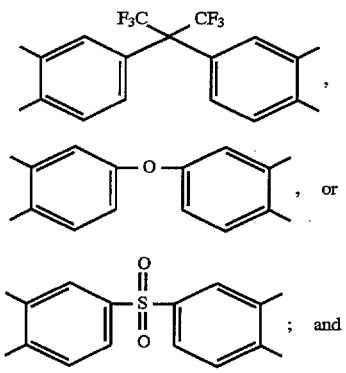

wherein said reaction between the diamine monomer and aromatic tetracarboxylic dianhydride takes place in an organic solvent to provide a poly(amic acid ester) having repeating units of formula

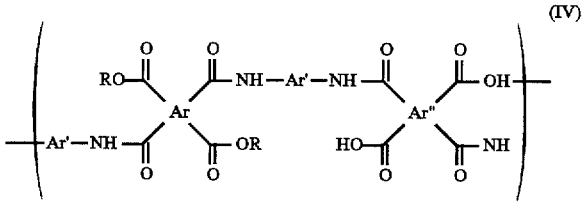

(IV)

wherein Ar, Ar' and Ar" and R are the same as defined above; and reacting the poly(amic acid ester) with a chemical imidating agent.

23. The process according to claim 17, wherein the solution of poly(imide amic ester) is provided by direct use of a solution of poly(imide amic ester) of formula (I) prepared by reacting a diamine monomer of the formula:

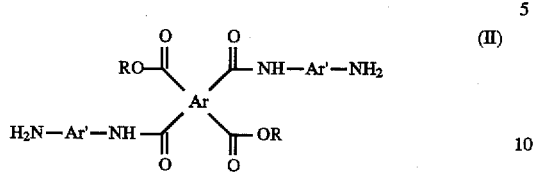 (II)

wherein Ar is

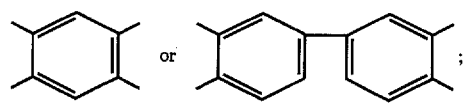

Ar' is

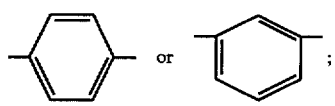

and R is a $C_{1-4}$ alkyl, selected from the group consisting of $CH_3$, $CH_2CH_3$, $CH(CH_3)_2$, $CH_2CH_2CH_3$, $CH_2CH_2CH_2CH_3$, $CH_2CH(CH_3)_2$ and $C(CH_3)_3$;

with an aromatic tetracarboxylic dianhydride of formula (III)

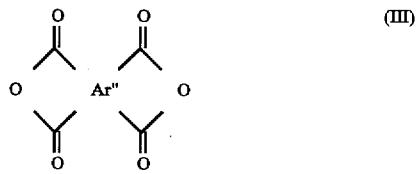

wherein Ar" is

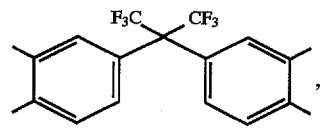,

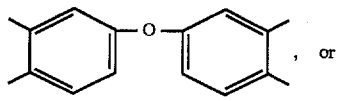, or

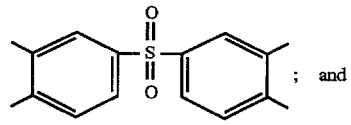; and wherein said reaction between the diamine monomer and aromatic tetracarboxylic dianhydride takes place in an organic solvent to provide a poly(amic acid ester) having repeating units of formula

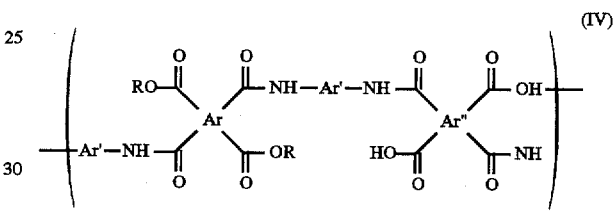 (IV)

wherein Ar, Ar' and Ar" and R are the same as defined above; and reacting the poly(amic acid ester) with a chemical imidating agent.

* * * * *

UNITED STATES PATENT AND TRADEMARK OFFICE
CERTIFICATE OF CORRECTION

PATENT NO. : 5,686,559

DATED : November 11, 1997

INVENTOR(S) : Rhee et al.

It is certified that error appears in the above-indentified patent and that said Letters Patent is hereby corrected as shown below:

Item [57]

In the Abstract, in the second line after the figures, after "$CH_2CH_2CH_3$" add --$CH_2CH_2CH_2CH_3$--.

In column 15, line 12, after "is" change "carded" to --carried--.

Claim 12, column 16, line 25, the last "Ar" should be --Ar"--.

Claim 17, column 18, line 20, change "$CH_2CH_2CH_3CH_3$," to --$CH_2CH_2CH_2CH_3^-$,--.

Signed and Sealed this

Twenty-fourth Day of March, 1998

Attest:

BRUCE LEHMAN

*Attesting Officer*   *Commissioner of Patents and Trademarks*